US011030024B2

(12) United States Patent
Nigam et al.

(10) Patent No.: US 11,030,024 B2
(45) Date of Patent: Jun. 8, 2021

(54) ASSIGNING A SEVERITY LEVEL TO A COMPUTING SERVICE USING TENANT TELEMETRY DATA

(71) Applicant: Microsoft Technology Licensing, LLC, Redmond, WA (US)

(72) Inventors: Rahul Nigam, Bothell, WA (US); Mark R. Gilbert, Issaquah, WA (US); Parminder Pal Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/554,495

(22) Filed: Aug. 28, 2019

(65) Prior Publication Data

US 2021/0064452 A1 Mar. 4, 2021

(51) Int. Cl.
*G06F 9/54* (2006.01)

(52) U.S. Cl.
CPC .................. *G06F 9/547* (2013.01)

(58) Field of Classification Search
CPC .................. H02J 50/80; H02J 50/12
See application file for complete search history.

(56) References Cited

U.S. PATENT DOCUMENTS

| 7,401,263 | B2 | 7/2008 | Dubois, Jr. et al. |
| 7,444,263 | B2 | 10/2008 | White et al. |
| 2003/0105863 | A1* | 6/2003 | Hegli .................... H04L 67/306 709/225 |
| 2006/0047643 | A1* | 3/2006 | Chaman ................ G06F 16/835 |
| 2006/0123042 | A1* | 6/2006 | Xie ..................... G06F 16/9577 |
| 2006/0143028 | A1* | 6/2006 | Altmann ............ G06Q 30/0201 705/7.29 |
| 2007/0168201 | A1 | 7/2007 | Chellam |

(Continued)

OTHER PUBLICATIONS

"ADF Performance Monitor: Monitoring with Percentiles", Retrieved from: https://www.adfpm.com/adf-performance-monitor-monitoring-with-percentiles/, Sep. 7, 2018, 7 Pages.

(Continued)

*Primary Examiner* — Doon Y Chow
*Assistant Examiner* — Phuong N Hoang
(74) *Attorney, Agent, or Firm* — Michael Best & Friedrich LLP

(57) ABSTRACT

Systems and methods for determining a severity level of a computing service. One system includes an electronic processor that is configured to receive telemetry data associated with one or more tenants of an online service providing services through a plurality of computing services and calculate, based on the telemetry data, a number of accesses of each of the plurality of computing services during a predetermined time period. The electronic processor is also configured to, for each of the plurality of computing services, assign a severity level to each computing service based on the number of accesses of each computing service during the predetermined time period. The electronic processor is further configured to, in response to detecting a failure of one of the plurality of computing services, initiate a response to the failure based on the severity level assigned to the one of the plurality of computing services.

15 Claims, 4 Drawing Sheets

(56) References Cited

U.S. PATENT DOCUMENTS

| | | | | |
|---|---|---|---|---|
| 2010/0098106 | A1* | 4/2010 | Sung | H04W 72/1236 370/461 |
| 2010/0235495 | A1* | 9/2010 | Petersen | H04L 63/1458 709/224 |
| 2015/0180732 | A1* | 6/2015 | Peng | G06F 9/5027 709/223 |
| 2015/0333987 | A1 | 11/2015 | Fletcher et al. | |
| 2016/0380803 | A1* | 12/2016 | Phadke | H04L 41/0806 709/221 |
| 2017/0124084 | A1* | 5/2017 | Borghetti | G06F 11/3495 |
| 2017/0250855 | A1* | 8/2017 | Patil | H04L 41/064 |

OTHER PUBLICATIONS

"Amazon CloudWatch", Retrieved from: https://web.archive.org/web/20181009062824/http:/docs.amazonaws.cn/en_us/AmazonCloudWatch/latest/monitoring/acw-ug.pdf, Oct. 9, 2018, 384 Pages.

"Monitoring Alarms", Retrieved from: https://www.cisco.com/c/en/us/td/docs/net_mgmt/prime/infrastructure/3-0/user/guide/pi_ug/alarms.pdf, Retrieved Date: Jul. 8, 2019, 14 Pages.

"Using BMC ProactiveNet Performance Management Triage and Remediation Solution—", Retrieved from: https://docs.bmc.com/docs/display/public/proactivenet96/Using+BMC+ProactiveNet+Performance+Management+Triage+and+Remediation+Solution, Retrieved Date: Jul. 9, 2019, 6 Pages.

"Zabbix Documentation 2.0", Retrieved from: https://web.archive.org/web/20170903030353/https:/www.zabbix.com/documentation/2.0/manual/config/triggers, Sep. 3, 2017, 1 Page.

Weatherill, Mark, "Measuring Transaction Response Time Against a Percentile Service Level Agreement", Retrieved from: https://www.ibm.com/developerworks/community/blogs/0587adbc-8477-431f-8c68-9226adea11ed/entry/transaction_responsetime_percentile_sla?lang=en, Jul. 1, 2011, 5 Pages.

West, Jamie, "How Baselines, Thresholds and Key Performance Indicators work together to Generate Events in the BMC ProactiveNet Operations Console", Retrieved from: https://docs.bmc.com/docs/display/public/proactivenet96/How+baselines%2C+thresholds+and+Key+Performance+Indicators+work+together+to+generate+events+in+the+BMC+ProactiveNet+Operations+Console, Oct. 28, 2013, 4 Pages.

Woodall, Zac, "Save Time with Data-driven Alerts in Tableau 10.3", Retrieved from: https://www.tableau.com/about/blog/2017/4/save-time-data-driven-alerts-tableau-103-67888, Apr. 5, 2017, 10 Pages.

"International Search Report and Written Opinion Issued in PCT Application No. PCT/US2020/037672", dated Sep. 21, 2020, 11 Pages.

* cited by examiner

| API Name | 1-Jan | 2-Jan | 3-Jan | 4-Jan | 5-Jan | ... | 26-Jan | 27-Jan | 28-Jan | 29-Jan | 30-Jan | Sum |
|---|---|---|---|---|---|---|---|---|---|---|---|---|
| API_1 | -24 | -7 | -12 | -11 | -24 | | -16 | -19 | 27 | -9 | -15 | -115 |
| API_2 | 2003 | 28393 | 28375 | 25809 | 5758 | | 6345 | 3445 | 30643 | 31760 | 29380 | 70011 |
| API_3 | 273 | 2030 | 1938 | 1961 | 398 | | 365 | 320 | 2448 | 2572 | 2708 | 70465 |
| API_4 | 277 | 2246 | 2084 | 2069 | 415 | | 394 | 325 | 2779 | 2935 | 2964 | 109408 |
| API_5 | 183 | 2608 | 3759 | 3862 | 1132 | | 759 | 959 | 5156 | 5837 | 5874 | |
| API_6 | 10 | 912 | 956 | 988 | 85 | | 73 | 109 | 519 | 623 | 713 | 15906 |
| API_7 | 4468 | 13538 | 43560 | 25071 | 8665 | | 12106 | 14369 | 24349 | 36132 | 30295 | |
| API_8 | 189 | 1102 | 1009 | 1079 | 266 | | 286 | 249 | 1482 | 1628 | 1656 | 77417 |
| API_9 | | | | | | | | | | | | |
| API_10 | 5105 | 7339 | 8368 | 8069 | 5988 | | 8805 | 8506 | 11355 | 12812 | 11873 | |
| | | | | | | | | | | | | |
| Percentile 25 | 184.5 | 1334 | 1241.25 | 1299.5 | 299 | | 305.75 | 266.75 | 1723.5 | 1864 | 1919 | 38065.5 |
| Percentile 50 | 275 | 2427 | 2921.5 | 2965.5 | 773.5 | | 576.5 | 642 | 3967.5 | 4386 | 4419 | 92037 |
| Percentile 75 | 3851.75 | 11988.25 | 23373.25 | 20820.5 | 5930.5 | | 8190 | 7240.75 | 21100.5 | 27023 | 25003.25 | 562207.25 |
| Percentile 95 | 282760.9 | 279468.6 | 229888.5 | 288871.2 | 292070.6 | | 132682.5 | 119735.8 | 101032.6 | 106636 | 111735.7 | 5177812.85 |
| | | | | | | | | | | | | 412.8125 |
| | | | | | | | | | | | | 3559 |
| | | | | | | | | | | | | 24983.375 |
| | | | | | | | | | | | | 292099.99 |

FIG. 4

ASSIGNING A SEVERITY LEVEL TO A COMPUTING SERVICE USING TENANT TELEMETRY DATA

FIELD

Embodiments described herein relate to determining the severity level of a computing service, such as components of an online service environment, using tenant telemetry data. The assigned severity level can be used to determine how to respond to a failure of the computing service.

SUMMARY

Online services provide various computing services to users. For example, an online service may use hundreds or thousands of application programming interfaces (APIs) to provide services to users. An individual API within the pool of APIs may have a different impact on the overall online service. For example, a first API may be used as part of a log-in process for a user, and, thus, is used by each user of the online service. A second API may be used to convert a file type from one type to another and thus, may be used only sporadically by one or more users. Accordingly, the first API is considered part of a highly critical path for the online services, and, thus, has a greater business impact on the online service as compared to the second API.

Typically, when a failure occurs within the online service, the failure is reviewed and addressed manually. This manual review may fail to identify or consider the importance of the failing API. Furthermore, any manual assessment of this importance may delays the remediation of the failure. In addition, without a proper understanding of the importance of the failing API, the response to the failure may be inefficient, such as by wasting resources. For example, sending out weekend requests to information technology (IT) professionals to address a failure of an API with low importance wastes time, monetary resources, and computing resources.

Accordingly, embodiments described herein automatically assign a severity level to a computing service, such as an online service or a particular API used within an online service. As used herein, a severity level assigned to a computing service, such as an API, generally represents the important of the service, which impacts how failures of the service should be handled or addressed. For example, the higher the assigned severity level, the lower the importance of the computing service. As one example, a severity level range of A to Z or 0 to n may be used, where Z and n represent the lowest severity levels. It should be understood that other scales can be used in some embodiments. For example, in other embodiments, the higher the assigned severity level, the higher the associated importance.

In some embodiments, tenant data, which may be randomly selected, is used to automatically assign a severity level. A tenant of an online service represents a group of one or more related users, such as a business or an organization. The tenant data includes telemetry data that indicates when and how a particular computing service is used by a tenant. The tenant data may be normalized to account for variances in use. For example, different computing services may have different usage rates at different times. For example, an API used by tenants to submit perform business-related activities (submit or approve reports, submit invoices, or the like) may have a high usage during normal business hours but may have a low usage at other times, such as after 5:00 pm on a weekday or one a weekend. Similarly, an API may have very low usage on a holiday as compared to a non-holiday. Furthermore, an API may have a particular usage by synthetic users (for example, back-end processing routines), which differs from non-synthetic users (human users) in terms of level of use, time of usage, and the like. As synthetic users do not experience failures in the same way as non-synthetic users (failures experienced by synthetic users typically do not impact business relationship with a provider of the online service as compared to non-synthetic users and processing associated with synthetic users can often be re-scheduled for subsequent completion with little or limited overall impact), assigning a severity level based on usage by non-synthetic users provides further advantages when addressing failures. For example, as described below, usage of an API can be measured by tracking the number of unique non-synthetic users that access the API during a predetermined time period to accurately assign a severity level.

As noted above, after a severity level is assigned, this level can be used to tailor a response to a detected failure. For example, if a critical API fails, a fast fix is desirable (for example, regardless of cost). Conversely, if a non-critical API fails, a more cost-effective approach may be used to address the failure. Similarly, different severity levels can be assigned for an API for different time periods, wherein the applicable severity level can be used based on when a failure is detected. For example, when an API fails at a time when the API is typically associated with high usage, a high severity level may be used to control how the failure is addressed. Conversely, when an API fails over a weekend where usage is usually low, a lower severity level may be used to control the response.

Therefore, embodiments described herein provide, among other things, methods and systems for automatically determining the severity of a computing service, such as an API, which can be used to efficiently address a failure of the API. For example, valuable computer resources are not wasted addressing a failure of an API with a low severity level (low importance) while failure of an API with a high severity level (high importance) can be addressed immediately to ensure that productivity remains high.

In particular, one embodiment provides a system for determining a severity level of a computing service. The system includes an electronic processor that is configured to receive telemetry data associated with one or more tenants of an online service. The online service provides services through a plurality of computing services. The electronic processor is also configured to calculate, based on the telemetry data, a number of accesses of each of the plurality of computing services during a predetermined time period and, for each of the plurality of computing services, assign a severity level to each computing service based on the number of accesses of each computing service during the predetermined time period relative to the number of accesses of another computing service included in the plurality of computing services during the predetermined time period. The electronic processor is further configured to, in response to detecting a failure of one of the plurality of computing services, initiate a response to the failure based on the severity level assigned to the one of the plurality of computing services.

Another embodiment provides a method of determining a severity level of a computing service. The method includes receiving, with an electronic processor, telemetry data associated with one or more tenants of an online service. The online service provides services through a plurality of computing services. The method further includes calculating a number of accesses of each of the plurality of computing services during a predetermined time period, based on the telemetry data and, for each of the plurality of computing services, assigning, with the electronic processor, a severity level to each computing service based on the number of accesses of each computing service during the predetermined time period relative to the number of accesses of another computing service included in the plurality of computing services during the predetermined time period. The method further includes, in response to detecting a failure of one of the plurality of computing services, initiating, with the electronic processor, a response to the failure based on the severity level assigned to the one of the plurality of computing services.

Yet another embodiment provides a non-transitory computer-readable medium including instructions executable by an electronic processor to perform a set of functions. The set of functions include receiving telemetry data associated with one or more tenants of an online service. The online service provides services through a plurality of computing services. The set of functions also include calculating a number of accesses of each of the plurality of computing services during a predetermined time period, based on the telemetry data and, for each of the plurality of computing services, assigning a severity level to each computing service based on the number of accesses of each computing service during the predetermined time period relative to the number of accesses of another computing service included in the plurality of computing services during the predetermined time period. The set of functions further include, in response to detecting a failure of one of the plurality of computing services, initiating a response to the failure based on the severity level assigned to the one of the plurality of computing services.

BRIEF DESCRIPTION OF THE DRAWINGS

FIG. 4 illustrates example tenant data used to assign severity levels to a plurality of application programming interfaces using the method of FIG. 3.

DETAILED DESCRIPTION

Figure 1:
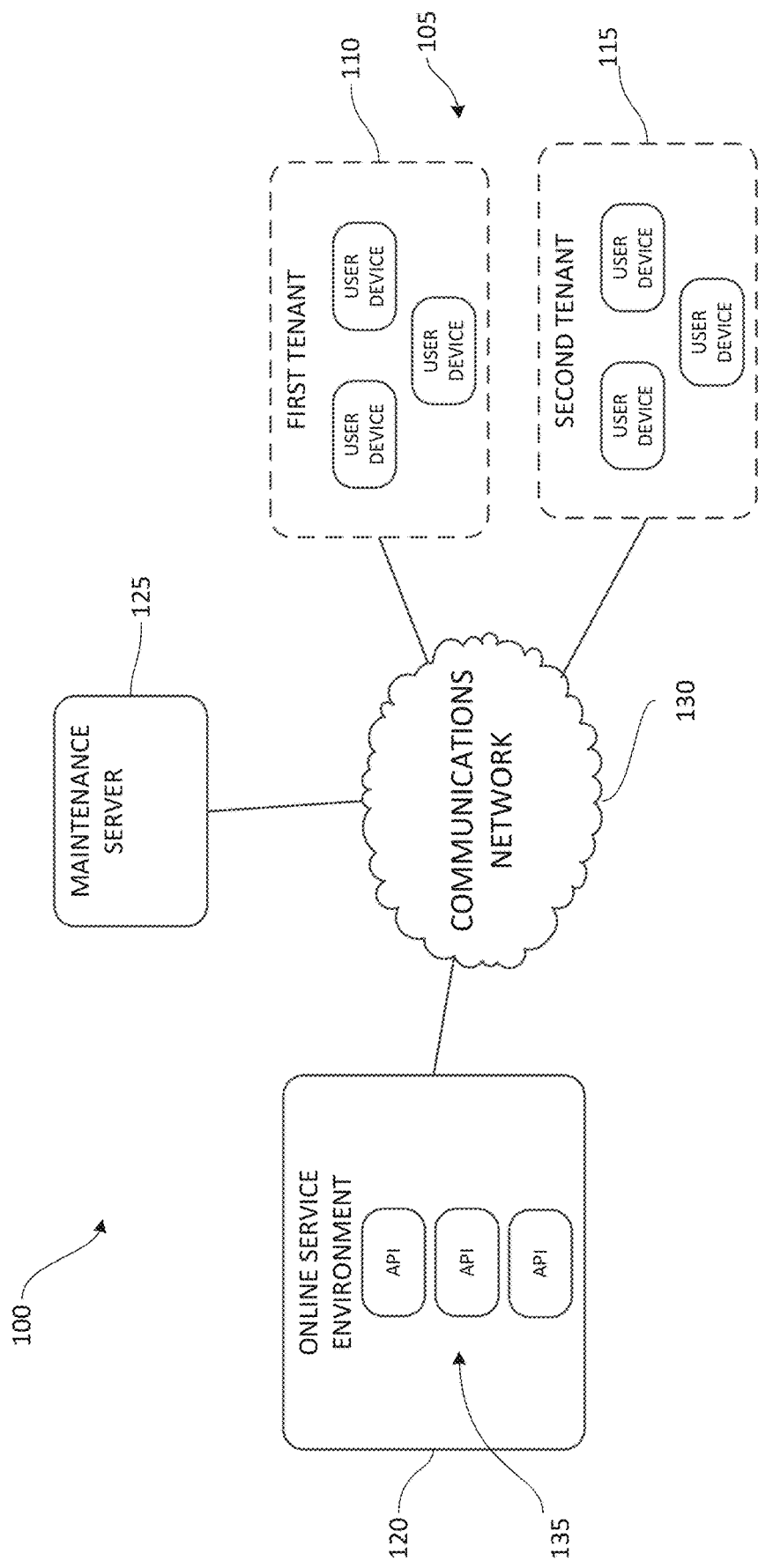
FIG. 1 schematically illustrates a system for determining the severity of a failure of an API according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, different computing services, such as APIs, may be associated with different levels of usage, which may represent different importance levels or criticality levels of the services. Embodiments described herein assign severity levels to computing services by tracking usage of the service during a predetermined time period and assigning severity levels based on the usage of one service relative to the usage of other services. The usage data may be collected from telemetry data associated with one or more tenants of an online service, such as a cloud computing environment and may be normalized to account for variances based on time of day, day of the week, holiday, or the like as well as accounting for differences in usage between synthetic and non-synthetic users. The assigned severity level can be used to determine how to respond to a failure of a particular service. For example, if an API with a high severity level fails, the assigned high severity level is used to initiate a fast fix to the failure.

FIG. 1 illustrates a system 100 for determining the severity level of a computing service according to one embodiment. Embodiments are described herein using APIs as the computing services. However, it should be understood that the assignment of severity levels as described herein may be used with any type of computing service (or components of such a service, such as applications, modules, functions, plug-ins, or the like) and is not limited to APIs. Similarly, the system 100 is described herein as providing an online service, such as a cloud computing environment, a collaboration platform, a file storage and management environment or the like. However, the methods and systems described herein are not limited in their use to any particular type of computing service.

As illustrated in FIG. 1, the system 100 includes one or more tenants 105 (illustrated in FIG. 1 as a first tenant 110 and a second tenant 115), an online service environment 120, and a maintenance server 125. It should be understood that the system 100 is provided as one example and, in some embodiments, the system 100 includes fewer or additional components in various configurations. For example, the system 100 may include a different number of tenants than the two tenants illustrated in FIG. 1, a different number of system maintenance servers than the single maintenance server 125 illustrated in FIG. 1, or combinations thereof. Furthermore, in some embodiments, the maintenance server is included in the online service environment 120.

The one or more tenants 105, the online service environment 120, and the maintenance server 125 are communicatively coupled via a communications network 130. The communications network 130 may be implemented using a wide area network (for example, the Internet), a local area network (for example, an Ethernet or Wi-Fi™ network), a cellular data network (for example, a Long Term Evolution (LTE™) network), and combinations or derivatives thereof. In some embodiments, components of the system 100 communicate through one or more intermediary devices, such as routers, gateways, or the like (not illustrated).

The online service environment 120 includes one or more computing devices (for examples, servers) that provide various computing services to the tenants 105. As illustrated in FIG. 1, each tenant 105 generally represent a group of one or more related users that access the online service environment 120 through a user device, such as a laptop computer, tablet computer, smart phone, smart wearable, smart television, desktop computer, terminal, or the like. As also illustrated in FIG. 1, the online service environment 120 provides services via a plurality of APIs 135. As noted above, the online service environment 120 can provide various services, such as productivity services (for example, the Office365® suite of productivity services provided by Microsoft Corporation, file hosting services (for example, the OneDrive® and SharePoint® platforms produced by Microsoft Corporation), or the like. In some embodiments, as users interact with the APIs 135, telemetry data is collected that tracks, for each of the APIs 135, the number of times the API was accessed. Additional information may also be tracked through the telemetry data, such as, for example, information regarding the user accessing the API, the date and time the API was accessed, and the like.

The maintenance server 125 communicates with the online service environment 120 via the communications network 130 and is configured to determine a severity level of a computing service as described herein. For example, the maintenance server 125 may determine a severity level of the APIs 135 included in the online service environment 120.

Figure 2:
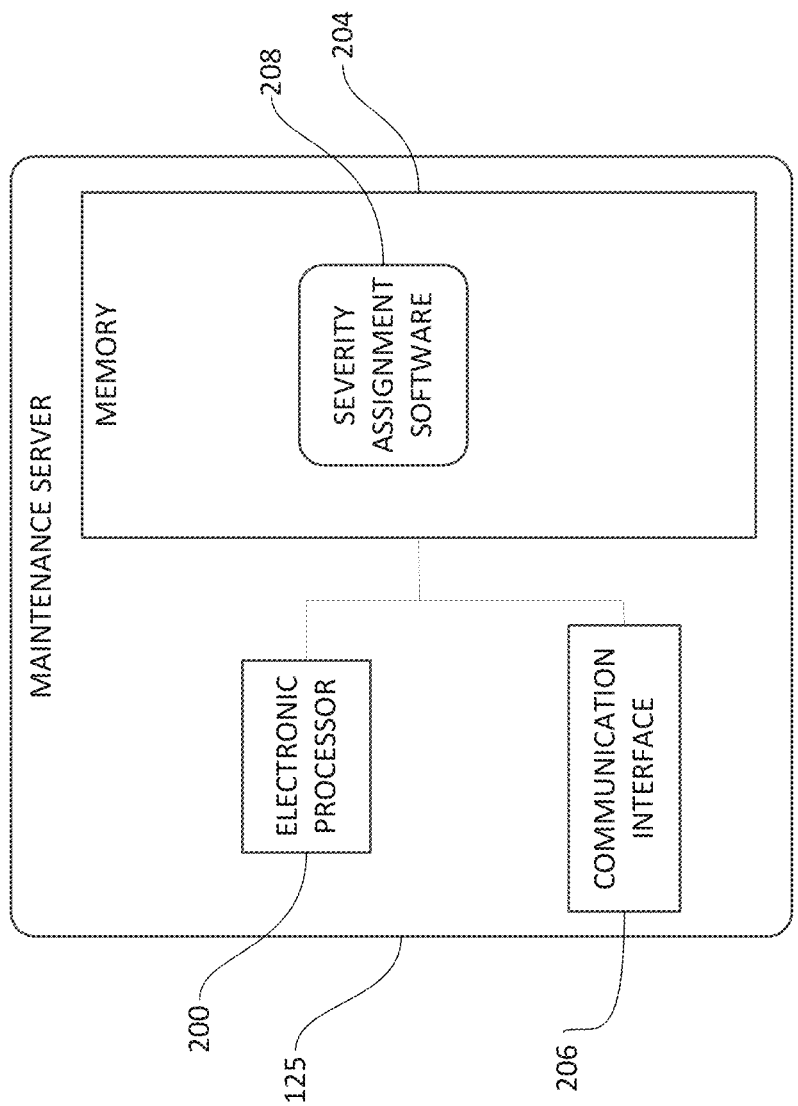
FIG. 2 schematically illustrates a system maintenance server of FIG. 1 according to some embodiments.

FIG. 2 schematically illustrates the maintenance server 125 according to some embodiments. As illustrated in FIG. 2, the maintenance server 125 is a computing device (for example, a network-attached server) including an electronic processor 200 (for example, a microprocessor, application-specific integrated circuit (ASIC), or another suitable electronic device), a memory 204 (for example, a non-transitory, computer-readable storage medium), and a communication interface 206, such as a transceiver, for communicating over the communications network 130 and, optionally, one or more additional communication networks or connections. It should be understood that the maintenance server 125 may include additional components than those illustrated in FIG. 2 in various configurations and may perform additional functionality than the functionality described in the present application. Also, it should be understood that the functionality described herein as being performed by the maintenance server 125 may be distributed among multiple devices, such as multiple servers and may be provided through a cloud computing platform, accessible by components of the system 100 via the communications network 130.

The electronic processor 200, the memory 204, and the communication interface 206 included in the maintenance server 125 are communicatively coupled wirelessly, over one or more communication lines or buses, or a combination thereof. The electronic processor 200 is configured to retrieve from the memory 204 and execute, among other things, software to perform the methods described herein. For example, in the embodiment illustrated in FIG. 2, the memory 204 includes severity assignment software 208. It should be understood that the memory 204 may store additional software and the software stored in the memory 204 (or other memory modules included in the maintenance server 125) may be distributed and combined in various configurations.

When executing the severity assignment software 208, the electronic processor 200 receives telemetry data for the one or more tenants 105 of the online service environment 120. In some embodiments, the severity assignment software 208 receives the telemetry data as the data is generated. In other embodiments, the severity assignment software 208 receives the telemetry data from one or more data sources. For example, in some embodiments, one or more databases may act as a repository for telemetry data, and the severity assignment software 208 accesses the telemetry data from the repository.

In some embodiments, telemetry data is generated when a user accesses the online service environment 120 or a component thereof. For example, each time a user accesses one of the APIs 135, telemetry data is generated and stored. The telemetry data may include a date and time of the access, an identifier of the user associated with the access, and an identifier of the API 135 being accessed. In some embodiments, the telemetry data includes additional information, such as an identifier of a tenant associated with the user, a type of access or use of the API 135, any failures by the API 135, and the like.

In some embodiments, the telemetry data may be associated with one of the one or more tenants 105 of the online service environment 120. For example, in some embodiments, telemetry data for a specific tenant is used to assign severity levels as described herein at a tenant-specific level. In these situations, depending on the size of the tenant or computing resources, all of available telemetry data for the tenant during a time period may be used or only a subset of available telemetry data may be used. In some embodiments, only a subset of the telemetry data for a particular tenant may be used by pulling telemetry data for specific users, users satisfying particular conditions, random users, or the like.

In other embodiments, the telemetry data may be associated with multiple tenants. In this situation, the severity levels assigned to the APIs 135 may be used for each tenant or multiple tenants of the online service environment 120. In some embodiments, the telemetry data for each of the multiple tenants is used. However, in other embodiments, only a subset of available telemetry data for multiple tenants is used. For example, in some embodiments, telemetry data may be selected randomly from the available data. In particular, telemetry data may be received for a random selection of tenants, tenants satisfying particular conditions (for example, particular size conditions, usage conditions, or the like), the first predetermined number of users of each tenant, or the like. Randomizing the telemetry data used to assign severity levels as described herein may help account for variances between tenants or other conditions and may also help create a standardized severity level and associated response for all tenants while also using computing resources efficiently.

It should also be understood that telemetry data may be received at different times or in different forms by the severity assignment software 208. For example, the severity assignment software 208 may receive the telemetry data in approximately real-time or may access the telemetry data at a predetermined frequency, such as on an hourly basis or daily basis.

The severity assignment software 208, as executed by the electronic processor 200, is also configured to normalize the telemetry data to calculate a number of accesses for each of the one or more APIs 135 for one or more predetermined time periods. In particular, the severity assignment software 208 may be configured to sum the number of accesses of an API 135 by unique non-synthetic users. The unique non-synthetic users may be identified using the user identifiers collected in the telemetry data. Accordingly, the number of unique non-synthetic users represents, in some embodiments, the number of accesses to the API.

For example, the telemetry data for the online service environment 120 may indicate that an API was accessed 200 times between 12 pm and 1 pm on Jan. 1, 2019. Based on this telemetry data, the severity assignment software 208 may process the telemetry data using a counter or similar mechanism, a list of unique, non-synthetic user identifiers, or both to count accesses by the API by each non-synthetic user. In particular, using the telemetry data, the severity assignment software 208 clears both the counter and the list to zero and then processes each access identified in the telemetry data. When an access is associated with a user identifier that is a recognized synthetic user (synthetic users may have a predetermined format to their identifier or may be stored in a log user identifiers associated with synthetic users) and the user identifier is not already on the list, the severity assignment software 208 adds a negative count (−1) to the counter and adds the identifier of the synthetic user to the list of identifiers. As noted above, a synthetic user is a program that accesses an API regardless of received user input, whereas a non-synthetic user is a program that accesses an API in direct response to user input. In some embodiments, a negative count is applied any time any synthetic user access is identified. In other embodiments, a negative count is applied once if any number of synthetic users access the API during the time period.

Alternatively, when an access is not associated with a user identifier that is a recognized synthetic user and the user identifier is not already on the list, the severity assignment software 208 add a positive count (+1) to the counter and adds the identifier to the list.

Using the above increments to the count, synthetic users are accounted for without simply ignoring the accesses by these users. For example, if a synthetic user accesses an API each hour of a given day and no non-synthetic users access the API during the day, a value of −24 will be calculated as the number of accesses of the API for that day, which provides additional information than merely stating that no non-synthetic users access the API. Similarly, if a synthetic user accesses an API for only 4 hours of a given day and no non-synthetic users access the API during the day, the calculated number of accesses is −4, which again provides more information than just stating that there are no non-synthetic accesses of the API.

It should be understood that other ways to count a number of accesses may be used in some embodiments. For example, each access of an API may be included in the calculated sum regardless of whether the access was by a unique user, by a non-synthetic user, or both. Furthermore, in some embodiments, accesses by non-synthetic users may be ignored or handled differently than assigning a negative count.

Thus, the severity assignment software 208 normalizes the telemetry data by accounting for synthetic users as well as multiple users by the same non-synthetic user to identify how many unique, non-synthetic users access an API for a predetermined time period. Other types of normalization may be performed as described below, including accounting for non-business ("out-of-scope") hours, days, or other periods. For example, accesses occurring during an out-of-scope time period may be counted different than other accesses, such as by adding a partial count (for example, 0.5 increment) or a multiple count (for example, +5) depending on the time period. In some embodiments, frequencies or patterns of accesses may also be considered to determine how to count accesses. For example, a single access that occurs at a predetermined frequency every day may be counted differently than a single access that occurs with a less defined frequency or pattern. In some embodiments, the severity assignment software 208 calculates a number of accesses of each of the APIs 135 for each hour of a day, which can be used to calculate a number of accesses of each of the APIs 135 for each day, each week, each month, and the like. As described below in more detail, these calculated numbered of accesses can be used to assign a severity level to an API 135, which can be stored (in the memory 204 of the maintenance server 125 or separate from the server 125) and associated with various triggers for remedying a failure of an API assigned the particular severity level.

Figure 3:
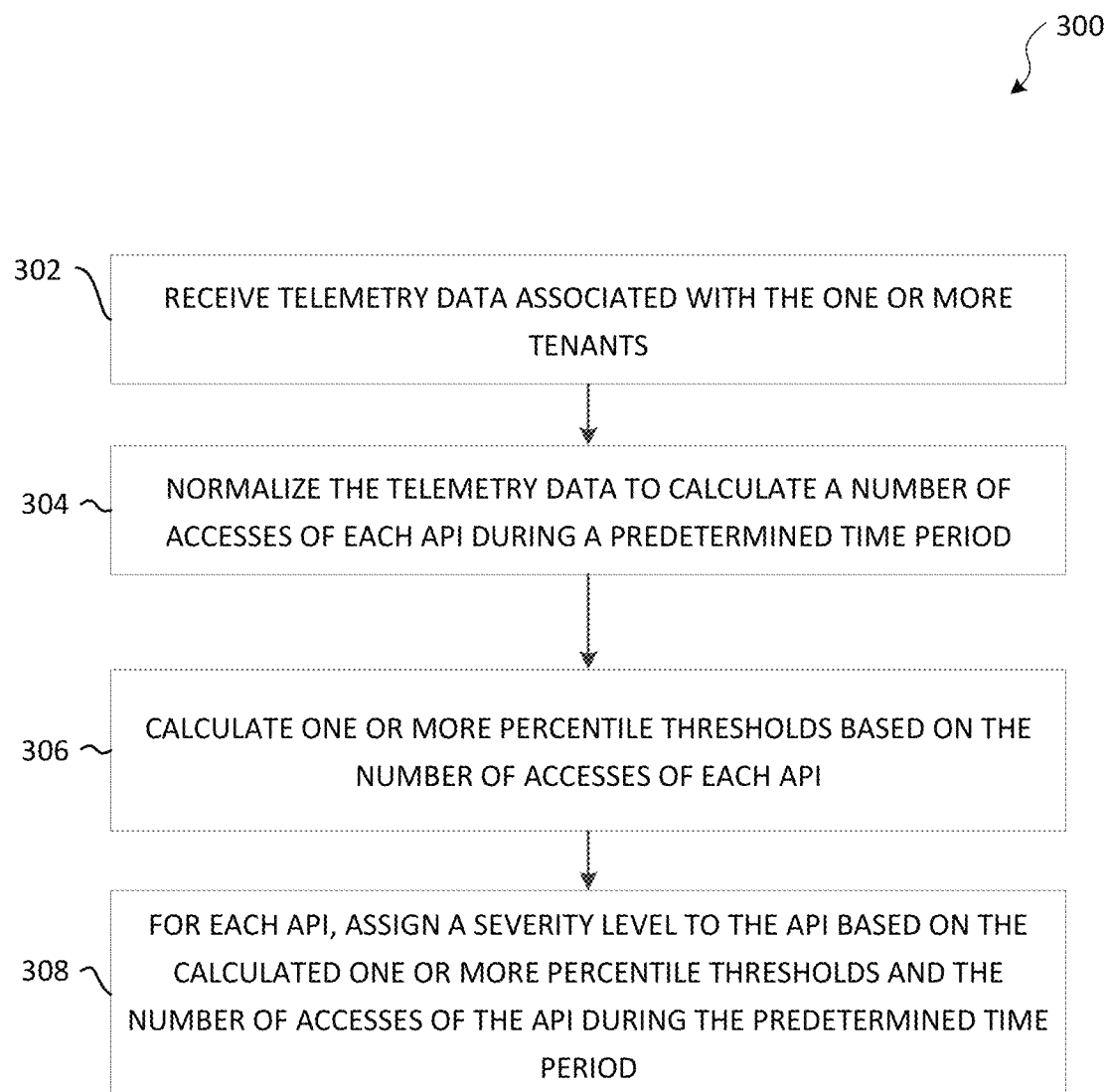
FIG. 3 is a flowchart illustrating a method performed by the system of FIG. 1 for determining the severity of a failure of an API according to some embodiments.

For example, FIG. 3 illustrates an example method 300 for automatically determining the severity of a failure of an API. The method 300 is performed by the maintenance server 125, and, in particular, is performed by software executed by the electronic processor 200, such as the severity assignment software 208. It should be understood that the functionality described herein with respect to the method 300 may be performed in a distributed manner, such as between multiple servers or computing devices or between multiple applications or systems. For example, in some embodiments, a portion of the method 300 may be performed by a telemetry management system, a failure detection system, a failure remediation system, or a combination thereof.

As illustrated in FIG. 3, the method 300 includes (at block 302), the electronic processor 200 receiving telemetry data associated with the one or more tenants. The electronic processor 200 normalizes the received telemetry data to calculate a number of access of each API during a predetermined time period (at block 304). For example, as described above, the electronic processor 200 may use the telemetry data to count a number of access of the API during the predetermined time period by unique, non-synthetic users. As also noted above, the telemetry data may be associated with one or more tenants of the online service environment 120 and, in some embodiments, is randomly selected.

In some embodiments, the predetermined period is an hour, a day, a week, a two-week period, a month, or the like. For example, in some embodiments, the electronic processor 200 determines a count of accesses for each API for each hour of a day, which can be aggregated or summed to calculate a count for other time periods. It should be understood that any time period may be used.

Using the calculated counts of accesses, the electronic processor 200 assigns a severity level to each of the plurality of computing services based on a comparison of the numbers of accesses of the computing services, wherein the severity level assigned to one API is assigned based on the usage of the API relative to the usage of other APIs.

For example, in one embodiment, as illustrated in FIG. 3, the electronic processor 200 calculates one or more percentile thresholds during the predetermined time period (at block 306). For example, assuming that the time period is a day, the electronic processor 200 may determine the greatest number of times an API 135 may be accessed during the span of a day and still be in the bottom 25 percent of the one or more APIs 135 included in the online service environment 120 based on the number of times that the APIs 135 have been accessed during the day. For example, the electronic processor 200 may determine that APIs 135 that are accessed less than 900 times during a day are in the bottom $25^{th}$ percentile of the one or more APIs 135 (in other words, 75 percent of the one or more APIs 135 were accessed more than 900 times during the day) and set 900 (a cutoff value for the $25^{th}$ percentile) as a first percentile threshold. The electronic processor 200 may also determine cutoff values for the $50^{th}$ percentile, $75^{th}$ percentile, and $95^{th}$ percentile and set the determined cutoff values as a second percentile threshold, a third percentile threshold, and a fourth percentile threshold, respectively. It should be understood that the electronic processor 200 may determine any number of percentile thresholds than the four percentile thresholds described herein and may be associated with different percentiles than the percentiles described herein.

After calculating the percentile thresholds, the electronic processor 200, for each of the one or more APIs 135, assigns a severity level to the API 135 based on the calculated one or more percentile thresholds and the number of accesses of the API 135 during the predetermined time period (at block 308). For example, a highest severity level may be assigned to APIs 135 that, during the predetermined time period, are accessed an equal or a greater number of times than the fourth percentile threshold associated with the $95^{th}$ percentile (the highest percentile threshold). Similarly, a lowest severity may be assigned to APIs 135 that, during the predetermined time period, are accessed a lesser number of times than the first percentile threshold associated with the $25^{th}$ percentile (the lowest percentile threshold). Accordingly, in some embodiments, the number of percentile thresholds set the number of available severity levels. It should be understood that other factors may also be considered to assign severity levels in addition to the percentile thresholds.

For example, FIG. 4 illustrates example number of accesses of ten different APIs (API_1, API_2, API_3, API_4, API_5, API_6, API_7, API_8, API_9, and API_10) for each day in January (only a subset of days in January are illustrated in FIG. 4 for sake of brevity). As illustrated in FIG. 4, in some embodiments, for each day a 25, 50, 75, and 95 percentile is calculated, and these same percentiles are calculated at the month level (as well as over the percentile for each day—see farthest right numbers). As also illustrated in FIG. 4, the individual counts (on a daily or monthly basis) for each API 135 can be shaded or color coded to represent where each counts falls with respect to the percentiles, which may represent the corresponding severity level assigned based on the count. For example, each daily count can be shaded in a first shade when the count falls below the 25 percentile threshold for the day, shaded in a second shade when the count falls between the 50 percentile and the 25 percentile for the day, shaded in a third shade when the count falls between the 75 percentile and the 50 percentile for the day, shaded in a fourth shade when the count falls between the 75 percentile and the 95 percentile for the day, and shaded in a fifth shade when the count falls at or above the 95 percentile for the day. Similar shading can be performed at the monthly level using the percentiles for the month. Accordingly, this shading provides a heat map indicating criticality or importance of various APIs over various time periods or conditions (for example, on a weekend vs. a weekday, on a holiday, and the like). As noted above, the shading can be used to assign severity levels. For example, each different shading can be associated with a different severity level. Alternatively, one or more shadings may be grouped into a single severity level. For example, all counts falling below the 50 percentile may be assigned one severity level. The different percentiles calculated for different time periods can be used to establish different severity levels for a single API as described in more detail below.

As noted above, calculating one or more percentile thresholds as described above represents one possible way to assign security levels based on the relative usage of the APIs. In some embodiments, the number of accesses calculated for the APIs 135 may be used in other ways to assign severity levels. For example, the calculated numbers can be used to calculate a median, mean, or other calculations, which can be used to assign particular access counts to particular buckets associated with corresponding severity levels. Accordingly, by comparing the usage of one API to other APIs by the same set of users (for example, by calculating calculate percentile thresholds, medians, means, or the like), the severity level of one API can be assigned based on how usage of the API compares to other APIs to ensure that critical APIs are identified and handled properly. Using this relative assignment accounts for low but otherwise important or regular uses of an API. For example, a tenant may have a small number of users such that the usage of any particular API remains low as compared to other tenants. If the usage counts are merely compared to manually-established thresholds, none of the APIs as used by the small tenant may be identified as critical or important. However, by comparing the usage of one API with the other APIs also used by the tenant (or multiple tenants), the methods and systems described herein more accurately identify and classify critical or important APIs, which results in efficient execution of remedial actions when an API fails.

Regardless of how the severity level is assigned to an API, the assigned severity level can be stored (in the maintenance server 125 or separate from the maintenance server) and can be associated with one or more trigger that define one or more remediation actions that are taken if the API fails. For example, when a failure of one of the APIs 135 is detected (the API becomes unresponsive or responds to one or more requests incorrectly), the severity level assigned to the failing API is retrieved and used to determine what (if any) remediation actions are taken. As described above, the remediation actions may include sending an urgent message to a team of engineers, applying a temporary software patch, disabling the failed API, sending a message to a system administrator regarding the issue, a combination of the foregoing, and the like.

In some embodiments, an API 135 is associated with multiple severity levels, wherein each severity level can be represent the severity or importance of the API under certain conditions. For example, an API 135 can be assigned a first severity level that represents the severity of the API during normal business hours on a weekday and a second severity level that represents the severity of the API during non-business hours (such as on a weekend day). Similarly, an API can be assigned a separate severity level for a holiday (or even a specific holiday). Accordingly, when a failure of the API is detected, the time and date of the failure can be used to select the appropriate severity level to apply. For example, when the failure is detected on a weekend, a stored severity level of the API for weekends can be retrieved and used to respond to the failure. As noted above, the severity assignment software 208 can normalize the telemetry data to generate the condition-specific severity levels, such as, for example, only include accesses occurring during one or times of a day, one or more days of a week, one or more times of a year, during a particular event, or the like. Accordingly, the multiple severity levels assigned to a particular API can represent different severity levels for different operating states of the API (when the API is operated or used on different days, different times of days, and the like), and, when a failure of the API detected, the operating state of the API associated with the failure can be used to select the appropriate severity levels. For example, when the failure is detected on a weekend, the assigned severity level associated with this operating state (a weekend operating state) can be retrieved and used to control the remediation process.

In some embodiments, if the calculations described above for a particular API results in an unknown or unacceptable number (for example, a number outside of an established range), a default severity level may be used. For example, telemetry data from a sample tenant, such as a test tenant, may be used to calculate default severity levels.

The method 300 described above may be executed periodically on an hourly, daily, weekly, monthly, or yearly basis to dynamically update severity levels to match current usage habits or patterns. Also, in some embodiments, the method 300 may be performed on demand or in response to a trigger, such as a detected failure, to ensure that the most update-to-date information is used to assign a severity level.

Thus, embodiments described herein provide, among other things, methods and systems for determining severity levels for computing services (or components thereof, such as APIs) that represent an importance or criticality of the computing service. Accordingly, when a failure is detected for the computing service, the assigned severity level can be used to effectively and efficiently respond to the failure.

Various features and advantages of some embodiments are set forth in the following claims.

What is claimed is:

1. A system for determining a severity level of a computing service, the system comprising:
   an electronic processor configured to
      receive telemetry data associated with one or more tenants of an online service, the online service providing services through a plurality of computing services;
      calculate, based on the telemetry data, a number of accesses of each of the plurality of computing services during a predetermined time period by counting each access by a unique user during the predetermined time period;
      for each of the plurality of computing services, assign a severity level to each computing service based on the number of accesses of each computing service during the predetermined time period relative to the number of accesses of another computing service included in the plurality of computing services during the predetermined time period; and
      in response to detecting a failure of one of the plurality of computing services, initiate a response to the failure based on the severity level assigned to the one of the plurality of computing services,
      wherein the electronic processor is configured to assign the severity level to each computing service based on the number of accesses of each computing service during the predetermined time period relative to the number of accesses of another computing service included in the plurality of computing services during the predetermined time period by calculating one or more percentile thresholds based on the number of accesses of each of the plurality of computing services and assigning the severity level to each of the plurality of computing services based on a comparison of the number of accesses of each of the plurality of computing services to the one or more percentile thresholds.

2. The system according to claim 1, wherein the plurality of computing services includes a plurality of application programming interfaces (APIs).

3. The system according to claim 1, wherein the electronic processor is configured to calculate the number of accesses for each of the plurality of computing services by counting each access by a unique non-synthetic user during the predetermined time period.

4. The system according to claim 1, wherein the electronic processor is further configured to normalize the telemetry data based on at least one selected from a group consisting of a time of day, a day of a week, and a time of a year.

5. The system according to claim 1, wherein the predetermined time period is one selected from a group consisting of an hour, a day, and a month.

6. The system according to claim 1, wherein the electronic processor is configured to select the one or more tenants randomly from a plurality of tenants using the online service.

7. The system according to claim 1, wherein the severity level assigned to at least one of the plurality of computing services is a first severity level associated with first operating condition of the at least one of the plurality of computing services and wherein the electronic processor is further configured to assign a second severity level to the at least one of the plurality of computing services, the second severity level associated with a second operating condition of the at least one of the plurality of computing services.

8. The system according to claim 7, wherein, in response to detecting a failure of the at least one of the plurality of computing services, the electronic processor is further configured to select one of the first severity level and the second severity level based on an operating state of the at least one of the plurality of computing services associated with the failure.

9. The system according to claim 1, wherein the one or more percentile thresholds includes a 25 percentile threshold, a 50 percentile threshold, a 75 percentile threshold, and a 95 percentile threshold.

10. A method of determining a severity level of a computing service, the method comprising:
receiving, with an electronic processor, telemetry data associated with one or more tenants of an online service, the online service providing services through a plurality of computing services;
calculating, with the electronic processor, a number of accesses of each of the plurality of computing services during a predetermined time period, based on the telemetry data by counting each access by a non-synthetic user during the predetermined time period differently than each access by a synthetic user during the predetermined time period;
for each of the plurality of computing services, assigning, with the electronic processor, a severity level to each computing service based on the number of accesses of each computing service during the predetermined time period relative to the number of accesses of another computing service included in the plurality of computing services during the predetermined time period; and
in response to detecting a failure of one of the plurality of computing services, initiating, with the electronic processor, a response to the failure based on the severity level assigned to the one of the plurality of computing services,
wherein assigning the severity level to each computing service based on the number of accesses of each computing service during the predetermined time period relative to the number of accesses of another computing service included in the plurality of computing services during the predetermined time period includes calculating a mean of the number of accesses of each of the plurality of computing services and assigning the severity level to each of the plurality of computing services based on a comparison of the number of accesses of each of the plurality of computing services to the mean.

11. The method according to claim 10, the method further comprising normalizing the telemetry data based on at least one selected from a group consisting of a time of day, a day of a week, and a time of a year.

12. The method according to claim 10, the method further comprising selecting the one or more tenants randomly from a plurality of tenants using the online service.

13. A non-transitory, computer-readable medium storing instructions that, when executed by an electronic processor, perform a set of functions, the set of functions comprising:
receiving telemetry data associated with one or more tenants of an online service, the online service providing services through a plurality of computing services;
calculating a number of accesses of each of the plurality of computing services during a predetermined time period, based on the telemetry data;
for each of the plurality of computing services, assigning a severity level from a plurality of predefined levels to each computing service based on the number of accesses of each computing service during the predetermined time period relative to the number of accesses of another computing service included in the plurality of computing services during the predetermined time period, wherein each plurality of predefined levels defines at least action to take in response to a subsequently-detected failure; and
in response to detecting a failure of one of the plurality of computing services, determining the severity level assigned to the one of the plurality of computing services and initiating the at least one action defined by the severity level assigned to the one of the plurality of computing services,
wherein the severity level assigned to at least one of the plurality of computing services is a first severity level associated with first operating condition of the at least one of the plurality of computing services and the set of functions further comprising assigning a second severity level to the at least one of the plurality of computing services, the second severity level associated with a second operating condition of the at least one of the plurality of computing services.

14. The non-transitory, computer-readable medium according to claim 13, the set of functions further comprising in response to detecting a failure of the at least one of the plurality of computing services, selecting one of the first severity level and the second severity level based on an operating state of the at least one of the plurality of computing services associated with the failure.

15. A system for determining a severity level of a computing service, the system comprising:
an electronic processor configured to
receive telemetry data associated with one or more tenants of an online service, the online service providing services through a plurality of computing services;
calculate, based on the telemetry data, a number of accesses of each of the plurality of computing services during a predetermined time period by counting each access by a unique user during the predetermined time period;
for each of the plurality of computing services, assign a severity level to each computing service based on the number of accesses of each computing service during the predetermined time period relative to the number of accesses of another computing service included in the plurality of computing services during the predetermined time period; and
in response to detecting a failure of one of the plurality of computing services, initiate a response to the failure based on the severity level assigned to the one of the plurality of computing services,
wherein the electronic processor is configured to assign the severity level to each computing service based on the number of accesses of each computing service during the predetermined time period relative to the number of accesses of another computing service included in the plurality of computing services during the predetermined time period by calculating a medium of the number of accesses of each of the plurality of computing services and assigning the severity level to each of the plurality of computing services based on a comparison of the number of accesses of each of the plurality of computing services to the medium.

* * * * *